(12) United States Patent
Klatt et al.

(10) Patent No.: US 7,789,655 B2
(45) Date of Patent: Sep. 7, 2010

(54) DEVICE FOR BLOW MOLDING CONTAINERS

(75) Inventors: Dieter Klatt, Hamburg (DE); Michael Litzenberg, Geesthacht (DE); Michael Linke, Ahrensburg (DE)

(73) Assignee: KHS Corpoplast GmbH & Co. KG, Hamburg (DE)

( * ) Notice: Subject to any disclaimer, the term of this patent is extended or adjusted under 35 U.S.C. 154(b) by 683 days.

(21) Appl. No.: 11/663,102

(22) PCT Filed: Jul. 26, 2005

(86) PCT No.: PCT/DE2005/001316

§ 371 (c)(1),
(2), (4) Date: Mar. 16, 2007

(87) PCT Pub. No.: WO2006/029585

PCT Pub. Date: Mar. 23, 2006

(65) Prior Publication Data

US 2007/0292550 A1    Dec. 20, 2007

(30) Foreign Application Priority Data

Sep. 18, 2004   (DE) ...................... 10 2004 045 405

(51) Int. Cl.
*B29C 49/36* (2006.01)
*B29C 49/56* (2006.01)
(52) U.S. Cl. ...................................... 425/540; 425/541
(58) Field of Classification Search ................. 425/525, 425/540, 541, DIG. 5
See application file for complete search history.

(56) References Cited

U.S. PATENT DOCUMENTS

| 3,843,286 | A | | 10/1974 | Horberg et al. |
| 5,064,366 | A | * | 11/1991 | Voss ........................... 425/541 |
| 2006/0093699 | A1 | * | 5/2006 | Arakelyan .................. 425/541 |

FOREIGN PATENT DOCUMENTS

| DE | 23 52 926 | 4/1975 |
| DE | 33 36 071 | 10/1985 |
| DE | 42 12 583 | 10/1993 |

(Continued)

OTHER PUBLICATIONS

Mechanical translation of DE 10212896 A1 dated Oct. 2003 obtained from the EPO website.*

(Continued)

*Primary Examiner*—Robert B Davis
(74) *Attorney, Agent, or Firm*—Lucas & Mercanti, LLP; Klaus P. Stoffel

(57) ABSTRACT

The invention relates to a device for blow molding containers. Initially, pre-forms, which are made of a thermoplastic material, are tempered and, subsequently, transformed into containers inside a blow form using the effects of a pressurized medium. Said blow form which is made up of at least two blow molding segments is held in place by mold supports of a blowing station. A bottom part is used in addition to the blow molding segments. Both the mold supports (19, 20) and the bottom part (7) are arranged in such a way that they can be mechanically positioned. The mold supports and the bottom part are permanently coupled to each other via a common mechanical drive unit (43).

10 Claims, 5 Drawing Sheets

FOREIGN PATENT DOCUMENTS

| | | |
|---|---|---|
| DE | 43 40 291 | 6/1995 |
| DE | 38 38 984 | 1/1997 |
| DE | 198 07 582 | 8/1999 |
| DE | 199 06 438 | 8/2000 |
| DE | 102 12 896 | 10/2003 |
| FR | 2 841 495 | 1/2004 |

OTHER PUBLICATIONS

Patent Abstracts of Japan, BD. 012, No. 018, (M-660), Jan. 20, 1988 & JP 62 178319 A (Toppan Printing Co Ltd), Aug. 5, 1987.

Patent Abstracts of Japan, BD. 016, No. 177, (M-1241), Apr. 28, 1992 & JP 04 018325 A (Nissei EE S B Kikai KK), Jan. 22, 1992.

* cited by examiner

DEVICE FOR BLOW MOLDING CONTAINERS

The invention concerns a device for blow molding containers, which has at least one blowing station for blow molding thermoplastic preforms into containers; in which the blowing station is provided with at least two blow mold segments that are supported by mold supports and with a base part; and in which both the mold supports and the base part are arranged in a way that allows them to be mechanically positioned.

In this type of container molding by the action of blowing pressure, preforms made of thermoplastic material, for example, preforms made of PET (polyethylene terephthalate), are fed to different processing stations within a blow-molding machine. Typically, a blow-molding machine of this type has a heating system and a blowing system, in which the preform, which has first been brought to a desired temperature, is expanded by biaxial orientation to form a container. The expansion is effected by means of compressed air, which is fed into the preform to be expanded. DE-OS 43 40 291 explains the process-engineering sequence in this type of expansion of the preform.

The basic structure of a blowing station for container molding is described in DE-OS 42 12 583. Possible means of bringing the preform to the desired temperature are explained in DE-OS 23 52 926.

Various handling devices can be used to convey the preforms and the blow-molded containers within the blow-molding device. The use of transport mandrels, onto which the preforms are slipped, has proven especially effective. However, the preforms can also be handled with other supporting devices. Other available designs involve the use of gripping tongs for handling the preforms and the use of expanding mandrels, which can be inserted in the mouth region of the preform to support the preform.

The handling of containers with the use of transfer wheels is described, for example, in DE-OS 199 06 438 with the transfer wheel arranged between a blowing wheel and a delivery line.

The above-explained handling of the preform occurs, for one thing, in so-called two-step processes, in which the preforms are first produced by injection molding and temporarily stored and then later conditioned with respect to their temperature and blown into containers. For another, the preforms can be handled in so-called one-step processes, in which the preforms are first produced by injection molding and allowed to solidify sufficiently and are then immediately suitably conditioned with respect to their temperature and then blow molded.

With respect to the blowing stations that are used, various embodiments are known. In the case of blowing stations that are arranged on rotating transport wheels, book-like opening of the mold supports is often encountered. However, it is also possible to use mold supports that can be moved relative to each other or that are guided in a different way. In stationary blowing stations, which are suitable especially for accommodating several cavities for container molding, plates arranged parallel to one another are typically used as mold supports.

Opening and closing movements of the blowing station and lifting movements of the base part are typically carried out by mechanical control means. In the case of blowing stations that are mounted on rotating transport wheels, cam segments that are mounted in a stationary way on the machine frame are used. Cam rollers are guided along the cam segments and are connected with the components to be moved. The cam segments are usually arranged only along those parts of the blowing wheel along which a change in the positioning of the associated cam rollers is provided. In the given end position that is provided, the cam rollers are then stabilized by suitable means.

To avoid mechanical damage in the event that a locking mechanism of the blowing station fails to open, both the drive mechanism for the mold supports and the drive mechanism for the lifting device for the base part are provided with an overload safety device. The overload safety devices that are used require a certain amount of installation space and are associated with extra costs.

The objective of the present invention is to improve a device of the aforementioned type in a way that allows compact construction.

In accordance with the invention, this objective is achieved by permanently coupling the mold supports and the base part with each other by a common mechanical drive mechanism.

The permanent mechanical coupling makes it possible to use a common drive and a common overload safety device for the base part and the mold supports. This reduces both production costs and the amount of installation space that is needed. Furthermore, the permanent mechanical coupling of the base part and the mold supports makes it easier to perform service work on the blowing stations, since the blowing station can be manually opened independently of the positioning of the associated cam control mechanism, and the lifting movement of the base part is derived directly from the opening movement of the mold supports and without additional activity by the service personnel.

In addition, the permanent mechanical coupling avoids mechanical stresses when the cam rollers enter associated locally limited cam segments and avoids problems due to possible incorrect positioning of the cam roller when it enters the cam segments.

Another design advantage is to be seen in the fact that due to the permanent mechanical coupling of the base part and the mold supports, only a common cam and a common cam roller are still necessary, so that, in addition, improved accessibility in the area of the blowing wheel can be realized.

The necessary positioning movement can be predetermined by coupling the drive mechanism with a control cam.

A robust and equally precise mechanical realization can be achieved if the drive mechanism has a camshaft that is provided with an articulated link for controlling the mold supports and with a positioning link for positioning the base part.

To adapt the drive mechanism to the design circumstances of a blowing station, it is provided that the base part is coupled with the drive mechanism via a spacer.

Simple and low-failure kinematics are produced if the base part is connected with a guide bush that is supported in such a way that it can move along a shaft.

It is especially conducive to a compact design if the guide bush moves along a station shaft of the blowing station.

To carry out opening and closing movements of the blowing station, it has been found to be advantageous to use a scissor-like adjustment mechanism for the positioning of the mold supports.

A simple predetermination of the raising and lowering movements that are to be carried out on the base part can be made if a cam roller of the positioning link engages a lifting cam, which is arranged in the area of a coupling element that is connected with the guide bush.

To achieve long-lasting, trouble-free operation, it has been found to be especially advantageous for the cam roller to move in a groove-like lifting cam in the coupling element.

The movements that are to be carried out can be coordinated with respect to time by presetting an offset with respect to time between the movements of the mold supports and the movements of the base part by the arrangement of the articulated link and the positioning link.

Another control-engineering variant consists in presetting a time offset between the movements of the mold supports and the movements of the base part by the curvature of the lifting cam.

Specific embodiments of the invention are illustrated in the schematic drawings.

Figure 1:
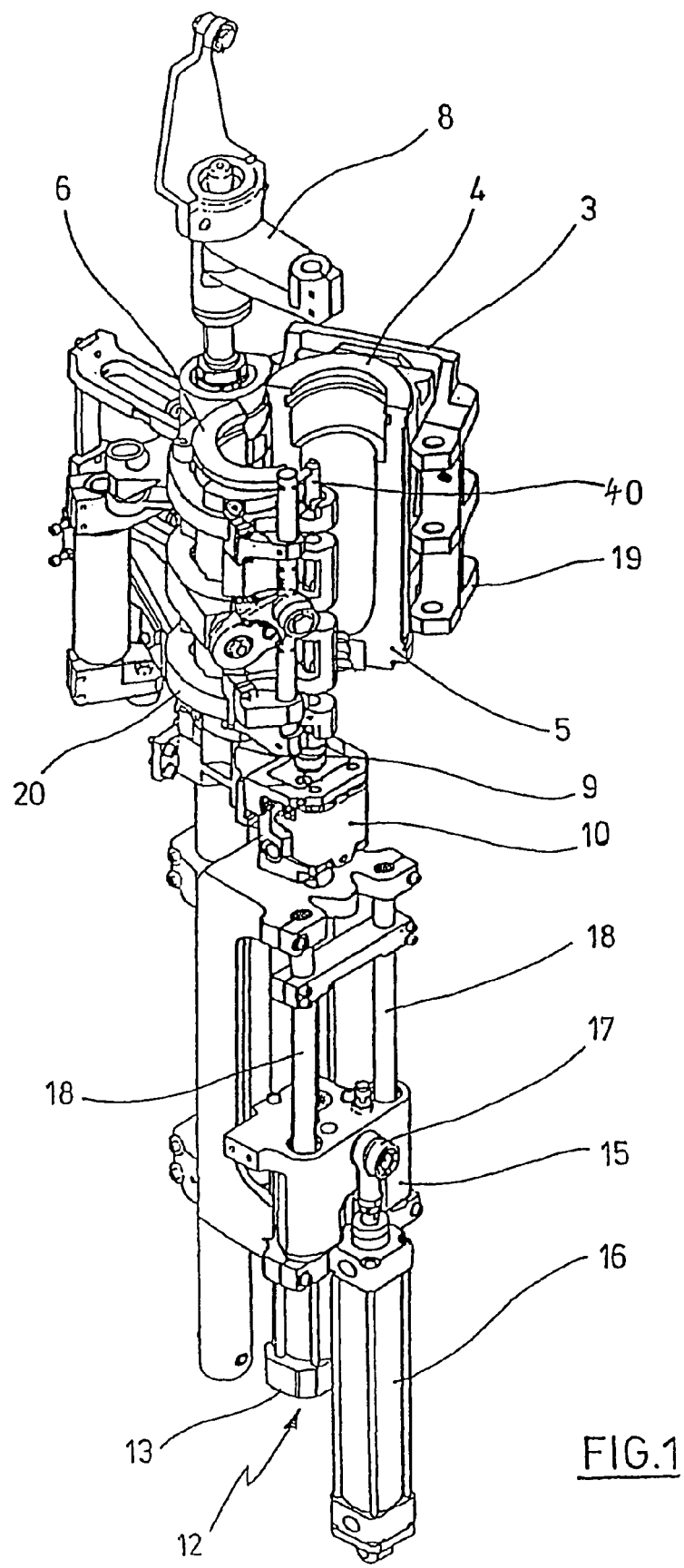
FIG. 1 is a perspective view of a blowing station for producing containers from preforms.
Figure 2:
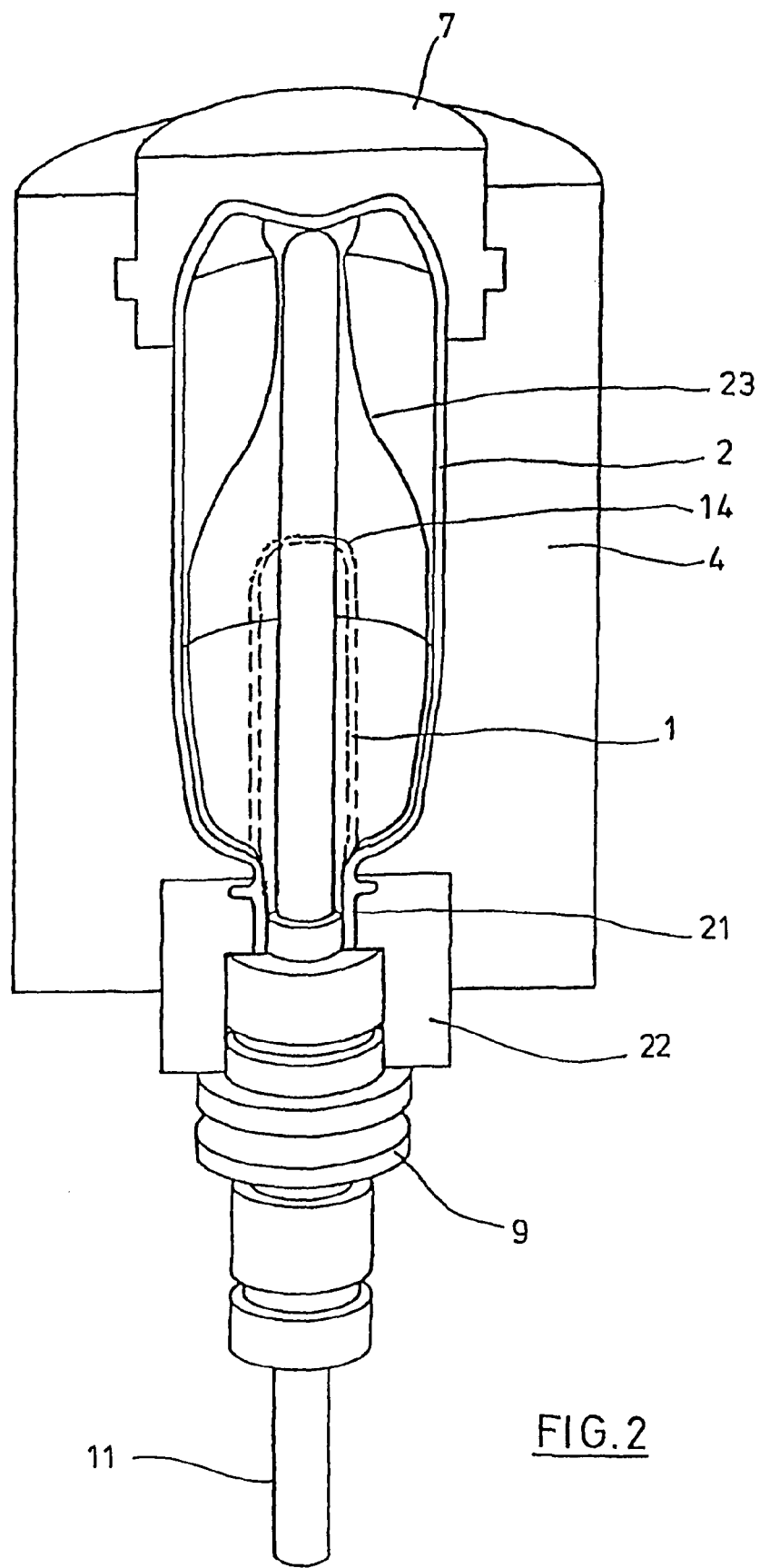
FIG. 2 is a longitudinal section through a blow mold, in which a preform is stretched and expanded.

FIGS. 1 and 2 show the basic design of a device for blow molding preforms 1 into containers 2.

The device for molding the container 2 consists essentially of a blowing station 3, which is provided with a blow mold 4, into which a preform 1 can be inserted. The preform 1 can be an injection-molded part made of polyethylene terephthalate. To allow a preform 1 to be inserted into the blow mold 4 and to allow the finished container 2 to be removed, the blow mold 4 consists of mold halves 5, 6 and a base part 7, which can be positioned by a lifting device 8. The preform 1 can be held in the area of the blowing station 3 by a transport mandrel 9, which, together with the preform 1, passes through a large number of treatment stations. However, it is also possible to insert the preform 1 directly into the blow mold 4, for example, with tongs or other handling devices.

To allow compressed air to be fed in, a connecting piston 10 is arranged below the transport mandrel 9. It supplies compressed air to the preform 1 and at the same time produces a seal relative to the transport mandrel 9. However, in a modified design, it is also basically possible to use stationary compressed air feed lines.

The preform 1 is stretched by means of a stretch rod 11, which is positioned by a cylinder 12. In principle, however, it is also possible to position the stretch rod 11 mechanically by means of cam segments, which are acted upon by pickup rollers. The use of cam segments is advantageous especially when a large number of blowing stations 3 is arranged on a rotating blowing wheel. The use of cylinders 12 is advantageous when stationary blowing stations 3 are provided.

In the embodiment illustrated in FIG. 1, the stretching system is designed in such a way that a tandem arrangement of two cylinders 12 is provided. Before the start of the actual stretching operation, the stretching rod 11 is first moved into the area of a base 14 of the preform 1 by a primary cylinder 13. During the stretching operation itself, the primary cylinder 13 with the stretch rod extended, together with a carriage 15 that carries the primary cylinder 13, is positioned by a secondary cylinder 16 or by means of cam control. In particular, it is proposed that the secondary cylinder 16 be used in such a way under cam control that a current stretching position is predetermined by a guide roller 17, which slides along a cam track while the stretching operation is being carried out. The guide roller 17 is pressed against the guide track by the secondary cylinder 16. The carriage 15 slides along two guide elements 18.

After the mold halves 5, 6, which are arranged in the area of supports 19, 20, are closed, the supports 19, 20 are locked relative to each other by means of a locking device 40.

To adapt to different shapes of a mouth section 21 of the preform 1, provision is made for the use of separate threaded inserts 22 in the area of the blow mold 4, as shown in FIG. 2.

In addition to the blow-molded container 2, FIG. 2 shows the preform 1, which is drawn with broken lines, and also shows schematically a container bubble 23 in the process of development.

Figure 3:
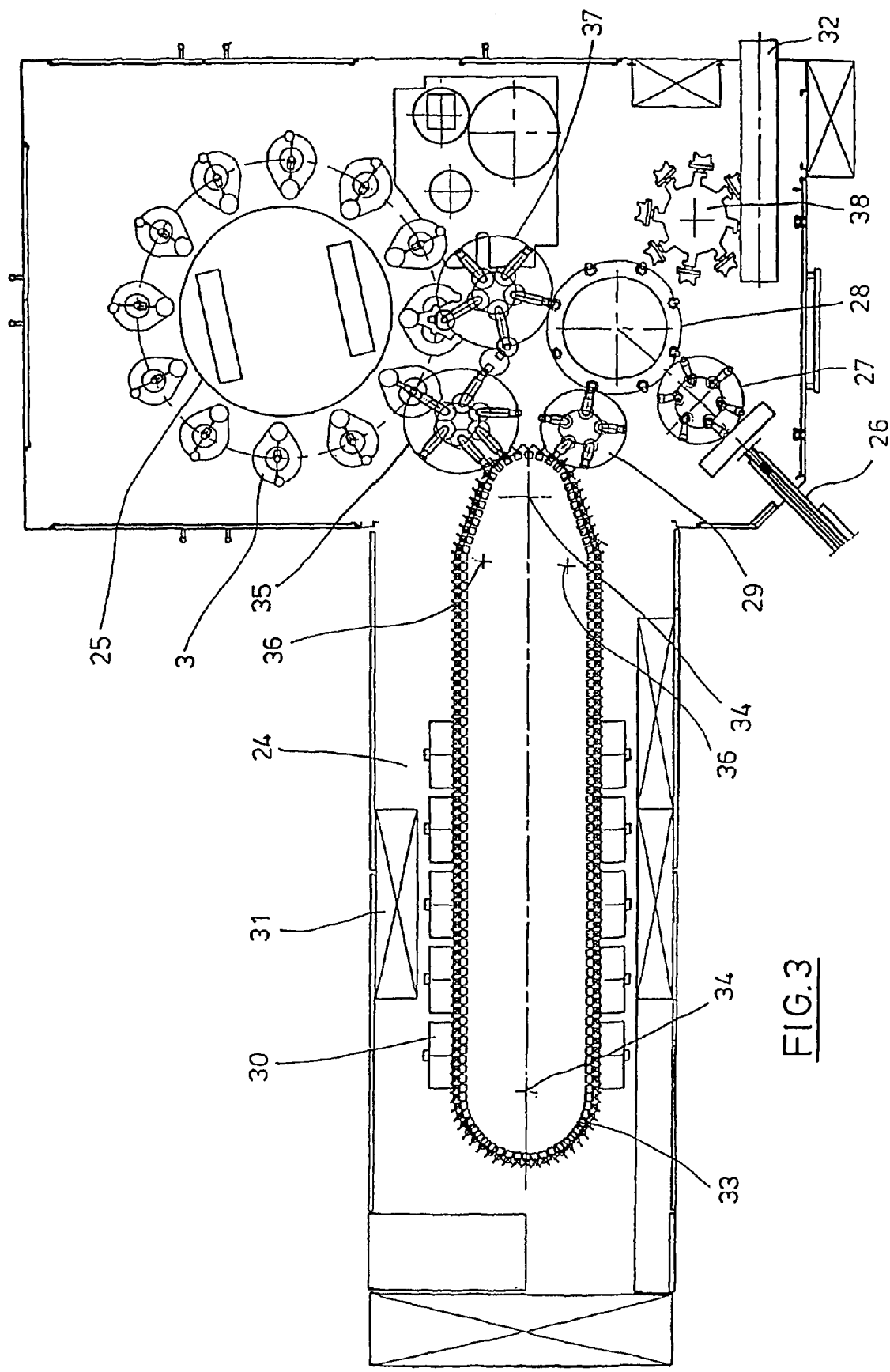
FIG. 3 is a drawing that illustrates a basic design of a device for blow molding containers.

FIG. 3 shows the basic design of a blow-molding machine, which has a heating line 24 and a rotating blowing wheel 25. Starting from a preform feeding device 26, the preforms 1 are conveyed to the area of the heating line 24 by transfer wheels 27, 28, 29. Radiant heaters 30 and fans 31 are arranged along the heating line 24 to bring the preforms 1 to the desired temperature. After sufficient heat treatment of the preforms 1, they are transferred to the blowing wheel 25, where the blowing stations 3 are located. The finished blow-molded containers 2 are fed to a delivery line 32 by additional transfer wheels.

To make it possible for a preform 1 to be blow molded into a container 2 in such a way that the container 2 has material properties that ensure a long shelf life of the foods, especially beverages, with which the container 2 is to be filled, specific process steps must be followed during the heating and orientation of the preforms 1. In addition, advantageous effects can be realized by following specific dimensioning specifications.

Various plastics can be used as the thermoplastic material. For example, PET, PEN, or PP can be used.

The preform 1 is expanded during the orientation process by feeding compressed air into it. The operation of supplying compressed air is divided into a preblowing phase, in which gas, for example, compressed air, is supplied at a low pressure level, and a subsequent main blowing phase, in which gas is supplied at a higher pressure level. During the preblowing phase, compressed air with a pressure in the range of 10 bars to 25 bars is typically used, and during the main blowing phase, compressed air with a pressure in the range of 25 bars to 40 bars is supplied.

FIG. 3 also shows that in the illustrated embodiment, the heating line 24 consists of a large number of revolving transport elements 33, which are strung together like a chain and are moved along by guide wheels 34. In particular, it is proposed that an essentially rectangular basic contour be set up by the chain-like arrangement. In the illustrated embodiment, a single, relatively large-sized guide wheel 34 is used in the area of the expansion of the heating line 24 facing the transfer wheel 29 and a feed wheel 35, and two relatively small-sized guide wheels 36 are used in the area of adjacent deflections. In principle, however, any other types of guides are also conceivable.

To allow the closest possible arrangement of the transfer wheel 29 and the feed wheel 35 relative to each other, the illustrated arrangement is found to be especially effective, since three guide wheels 34, 36 are positioned in the area of the corresponding expansion of the heating line 24, namely, the smaller guide wheels 36 in the area of the transition to the linear stretches of the heating line 24 and the larger guide wheel 34 in the immediate area of transfer to the transfer wheel 29 and transfer to the feed wheel 35. As an alternative to the use of chain-like transport elements 33, it is also possible, for example, to use a rotating heating wheel.

After the blow molding of the containers 2 has been completed, the containers 2 are carried out of the area of the blowing stations 3 by an extraction wheel 37 and conveyed to the delivery line 32 by the transfer wheel 28 and a delivery wheel 38.

Figure 4:
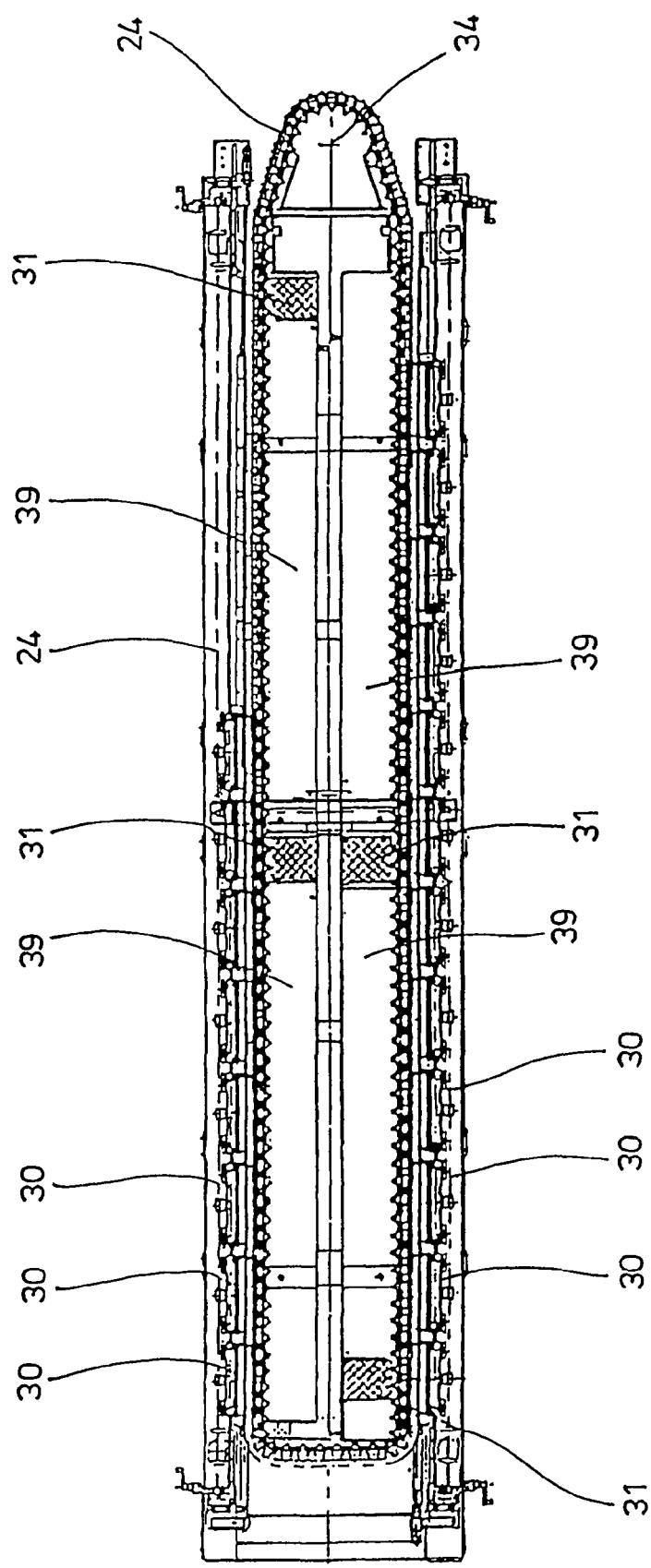
FIG. 4 is a modified heating line with increased heating capacity.

In the modified heating line 24 illustrated in FIG. 4, a larger number of preforms 1 can be heated per unit time due to the larger number of radiant heaters 30. The fans 31 in this case feed cooling air into the area of cooling air ducts 39, which lie opposite the associated radiant heaters 30 and deliver the cooling air through discharge ports. A direction of flow of the cooling air essentially transverse to the direction of conveyance of the preforms 1 is realized by the arrangement of the discharge directions. In the area of surfaces opposite the radiant heaters 30, the cooling air ducts 39 can provide reflectors for the thermal radiation. It is also possible to realize cooling of the radiant heaters 30 by the delivered cooling air.

Figure 5:
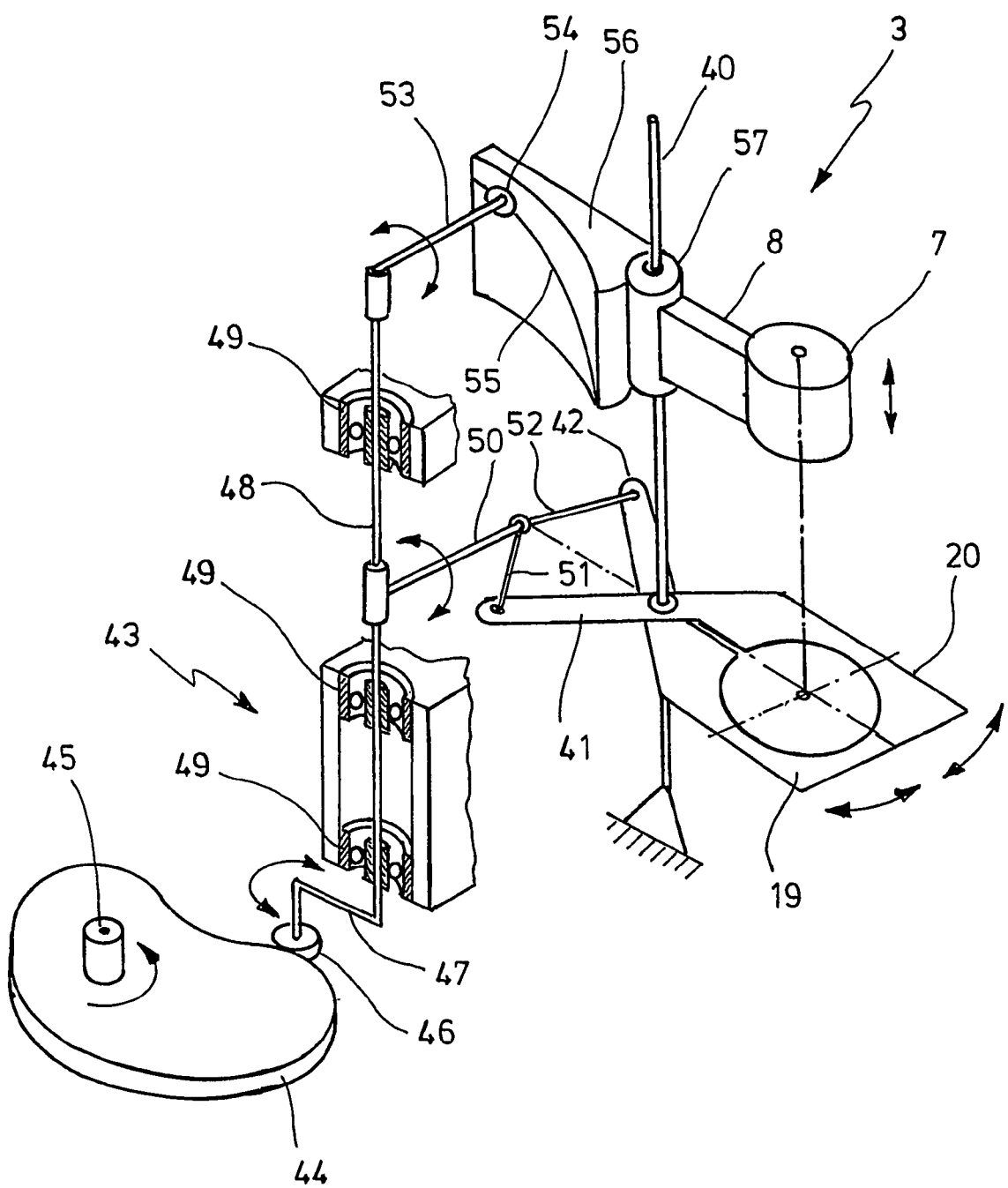
FIG. 5 is a schematic drawing that illustrates a permanent mechanical coupling between the mold supports and the base part and a common cam control mechanism.

FIG. 5 is a schematic representation of the mechanical drive for the sequences of movements of the mold supports 19, 20 and the base part 7. The mold supports 19, 20 are shown in simplified form. The drawing shows that the mold supports 19, 20 are arranged to swivel relative to a station shaft 40. The mold supports 19, 20 are coupled with a drive mechanism 43 by operating arms 41, 42. The drive mechanism 43 has a control cam 44, which is mounted in a stationary position on a machine frame of the blow-molding machine.

The blowing stations 43 are moved about an axis 45 of the blowing wheel 25. A cam roller 46 associated with each blowing station 3 is guided along the control cam 44. The cam roller 46 is supported on a transverse link 47, which is connected with a camshaft 48. A swiveling motion of the transverse link 47 is translated into a rotational motion of the camshaft 48. The camshaft 48 is supported by a plurality of bearings 49.

An articulated link 50 is mounted on the camshaft 48 and is connected by connecting links 51, 52 with the operating arms 41, 42 of the mold supports 19, 20. Each connecting link 51, 52 is pivoted, on the one hand, with one of the operating arms 41, 42 and, on the other hand, with the articulated link 50. A swiveling motion of the articulated link 50 produced by the rotational motion of the camshaft 48 thus causes the operating arms 41, 42 to be brought together or spread apart and thus causes the mold supports 19, 20 to be opened or closed.

In addition, the camshaft 48 is coupled with a positioning link 53, which supports a cam roller 54 at its end that faces away from the camshaft 48. The roller 54 is guided along a lifting cam 55, which is arranged in the area of a coupling element 56. The coupling element 56 is connected with a guide bush 57, which can move along the station shaft 40. The guide bush 57 is also coupled with the base part 7.

In the embodiment illustrated in FIG. 5, the lifting cam 55 is designed as a groove-like recess in a coupling element 56 with a curved boundary. The curvature is concentric with the camshaft 48. When the positioning link 53 rotates, the coupling element 56 is raised or lowered by means of the cam roller 54, and the base part 7 is synchronously raised or lowered.

To realize a phase offset between the beginning or end of the opening or closing movement of the mold supports 19, 20 and the occurrence of the lifting movement of the base part 7, the lifting cam 55 can be provided with a horizontally extending cam region. For a vertically extending camshaft 48, movement of the cam roller 54 in a horizontal region of the lifting cam 55 will produce no lifting or lowering movement of the base part 7. The speed at which the lifting or lowering movement of the base part 7 is carried out is preset by the steepness of the lifting cam 55.

The invention claimed is:

1. A device for blow molding containers, which has at least one blowing station for blow molding thermoplastic preforms into containers; in which the blowing station is provided with at least two blow mold segments that are supported by mold supports and with a base part; and in which both the mold supports and the base part are arranged in a way that allows them to be mechanically positioned, wherein the mold supports (19, 20) and the base part (7) are permanently coupled with each other by a common mechanical drive mechanism (43), wherein the drive mechanism (43) is coupled with a control cam (44), wherein the blow station is mounted on a rotation blow-wheel, and wherein the control cam (44) is mounted stationary in the area of a machine frame of the device for blow molding.

2. A device in accordance with claim 1, wherein the drive mechanism (43) has a camshaft (48) that is provided with an articulated link (50) for controlling the mold supports (19, 20) and with a positioning link (53) for positioning the base part (7).

3. A device in accordance with claim 1, wherein the base part (7) is coupled with the drive mechanism (43) via a spacer.

4. A device for blow molding containers, which has at least one blowing station for blow molding thermoplastic preforms into containers; in which the blowing station is provided with at least two blow mold segments that are supported by mold supports and with a base part; and in which both the mold supports and the base part are arranged in a way that allows them to be mechanically positioned, wherein the mold supports (19, 20) and the base part (7) are permanently coupled with each other by a common mechanical drive mechanism (43), wherein the base part (7) is connected with a guide bush (57) that is supported in such a way that it can move along a shaft.

5. A device in accordance with claim 4, wherein the guide bush (57) moves along a station shaft (40) of the blowing station (3).

6. A device in accordance with claim 1, wherein a scissor-like adjustment mechanism is used for the positioning of the mold supports (19, 20).

7. A device in accordance with claim 1, wherein a cam roller (54) of the positioning link (53) engages a lifting cam (55), which is arranged in the area of a coupling element (56) that is connected with the guide bush (57).

8. A device in accordance with claim 7, wherein the cam roller (54) moves in a groove-like lifting cam (55) in the coupling element (57).

9. A device in accordance with claim 1, wherein an offset with respect to time between the movements of the mold supports (19, 20) and the movements of the base part (7) is predetermined by the arrangement of the articulated link (50) and the positioning link (53).

10. A device in accordance claim 1, wherein an offset with respect to time between the movements of the mold supports (19, 20) and the movements of the base part (7) is predetermined by the curvature of the lifting cam (55).

* * * * *